P. L. MARDIS.
CONTROL APPARATUS.
APPLICATION FILED JUNE 4, 1915.
1,358,769.
Patented Nov. 16, 1920.
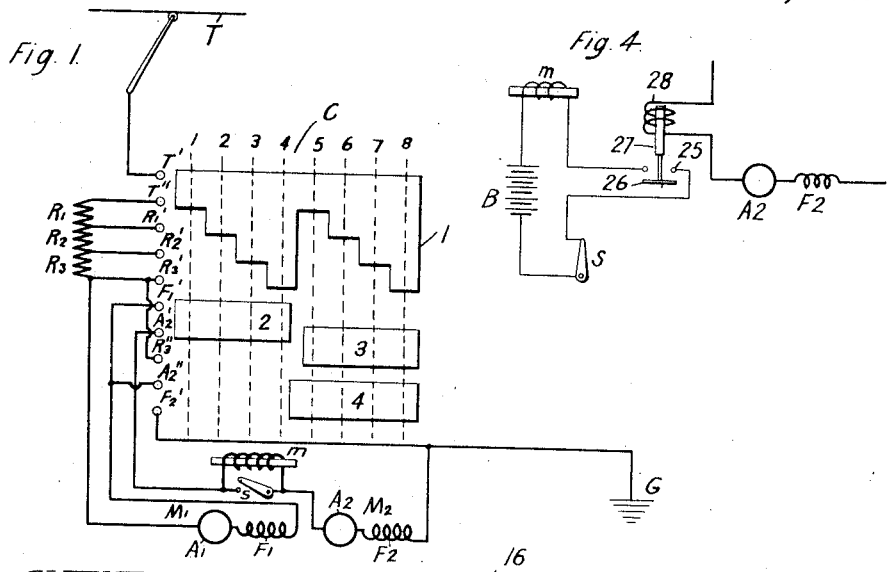
Fig. 1.
Fig. 4.
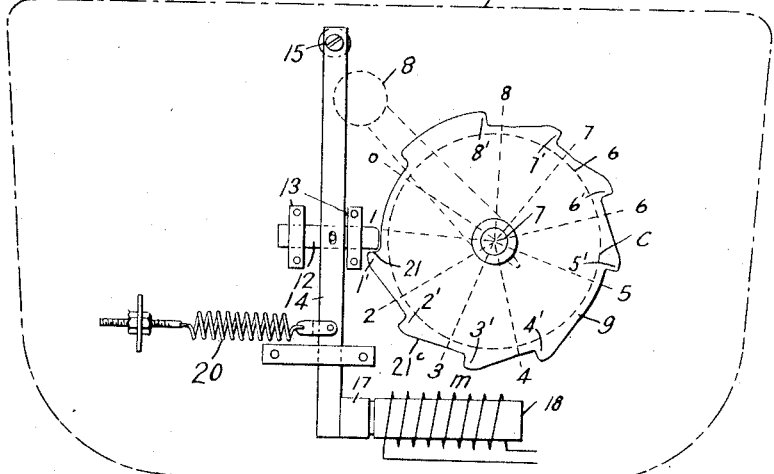
Fig. 2.
Fig. 3.
WITNESSES:
Fred H. Miller
W. R. Coley
INVENTOR
Paul L. Mardis
BY
Donald H. Mace
ATTORNEY

UNITED STATES PATENT OFFICE.

PAUL L. MARDIS, OF ALTOONA, PENNSYLVANIA, ASSIGNOR TO WESTINGHOUSE ELECTRIC & MANUFACTURING COMPANY, A CORPORATION OF PENNSYLVANIA.

CONTROL APPARATUS.

1,358,769. Specification of Letters Patent. Patented Nov. 16, 1920.

Application filed June 4, 1915. Serial No. 32,178.

*To all whom it may concern:*

Be it known that I, PAUL L. MARDIS, a citizen of the United States, and a resident of Altoona, in the county of Blair and State of Pennsylvania, have invented a new and useful Improvement in Control Apparatus, of which the following is a specification.

My invention relates to control apparatus for governing the operation of dynamo-electric machines, and it has particular reference to means for controlling the operation of railway motors, although it is not so restricted and is equally applicable to motors of the so-called industrial class.

One of the objects of my invention is to provide a control apparatus of the above-indicated character which shall be simple in arrangement and construction, effective and reliable in operation and which shall be especially adapted to prevent the abuse and mis-use of electrical driving units of whatever nature may be employed.

Another object of my invention is to provide an improved and thoroughly dependable device of the general class known as "automotoneers", which shall find a wide and needed field of service in protecting electric railway motors against abnormal conditions of operation during the periods of acceleration and which, moreover, shall be flexible and adaptable to varying conditions of grade and loads such as are encountered in service upon practically all electric railway systems.

Still another object of my invention is to provide means for compelling a so-called "notching-up" manipulation of the ordinary drum controller or master controller of the usual railway control system, whereby the system may be rendered semi-automatic and dependent upon the motor current, at the will of the operator.

More specifically stated, my invention contemplates the provision of a current-limiting control device or automotoneer which, under normal conditions of acceleration, shall be adapted to positively arrest the forward movement of the manually operated controller or master controller in each of its operative positions until the motor current, which increases in each position by reason of the progressive exclusion of accelerating resistance, shall have been reduced to a predetermined value.

In the prior art, automotoneers have usually taken the form of mechanical devices which are applied to the familiar controllers and which embody mechanical obstructions that are encountered in each position of the controller and that necessitate a more or less distinct "notching-up" operation which is intended to delay the forward movement of the controller sufficiently to protect the motors from being subjected to excessive and damaging amounts of current.

Such classes of apparatus, however, only partially and inadequately perform their intended functions by reason of the fact that they may be operated so rapidly as to be practically useless as protective devices under abnormal load or grade conditions. The mechanisms are not in any sense dependent upon actual conditions of service and may be manipulated with the same rapidity of movement, irrespective of the grade or load conditions which obtain.

According to my invention, I propose to associate with a controller or master controller, a notched segment having a plurality of teeth corresponding to the various operative positions of the control device and which are located a predetermined distance beyond these positions, and, adapted for coöperative engagement therewith, I provide an electro-responsive electromagnetically actuated pawl which is automatically moved into engagement with the successive teeth of the segment for the purpose of positively arresting the forward movement of the controller in each of its positions until normal current conditions are reëstablished.

The operating electromagnet is designed with respect to various resistance steps, so that the usual increase of current resulting from the cutting-out of the accelerating resistance, shall effect its actuation, whereby a step-by-step movement of the controller is compelled under all normal accelerating conditions. The motor current may directly influence the operation of the restraining pawl, or a relay of current limit switch may be employed that completes a circuit through an auxiliary source of energy which periodically energizes the actuating magnet of the detaining pawl at each step in accordance with the current conditions of the motor circuit.

My invention may best be understood by reference to the accompanying drawings in which Figure 1 is a diagrammatic view of a control system embodying my invention; Fig. 2 is a plan view of control apparatus constructed in accordance with my invention; Fig 3 is a plan view of a portion of a modified form of apparatus similar to that shown in Fig. 2; and Fig. 4 is a diagrammatic view of a portion of a control system embodying a modification of the system shown in Fig. 1.

Referring to Fig. 1, a plurality of motors M1 and M2 are adapted to receive energy from a trolley conductor T through accelerating resistors R1, R2 and R3, the circuit connections of the motors and of the resistors being governed through the agency of a controller C of any suitable form. The motors M1 and M2 are of the series type, being provided respectively with armatures A1 and A2 and field magnet windings F1 and F2, and said motors are particularly adapted for the propulsion of electric railway vehicles, although my invention is not restricted to any specific type of motor and is applicable to other forms of motors, such as are used commonly in industrial service.

The controller C embodies a plurality of movable conducting segments 1, 2, 3 and 4, which are adapted for coöperative engagement with a plurality of stationary contact terminals T′, T″, R1′, R2′, R3′, F1′, A2′, R3″, A2″ and F2′ upon the position-indicating lines 1, 2, 3, 4, 5, 6, 7, 8, whereby the acceleration and circuit connections of the motors M1 and M2 and resistors, R1, R2 and R3 are governed.

The system, as shown, is adapted for the control of only two motors, but it will be understood that my invention may be embodied in a four motor equipment, or, in fact, in a system for controlling any number of motors.

In circuit with the motor M2 is a current-limiting electro-magnet $m$ which is traversed by the motor current when a switch $s$ occupies its open position, as shown.

Reference may now be had to Fig. 2 in which the controller C embodies a control drum 6 upon which the movable conducting segments 1, 2, 3 and 4 are disposed, said drum being adapted to occupy a plurality of operative positions 1, 2, 3, 4, 5, 6, 7 and 8, as indicated by the dotted radial lines. These several positions correspond to those shown in Fig. 1 by the position-indicating lines 1 to 8, inclusive, and in each of said positions, the controller C is brought into engagement with certain of its coöperating contact terminals, as already described, for the purpose of progressively excluding the accelerating resistors R1, R2 and R3 and arranging the circuit connections of the motors M1 and M2 for series and parallel operation.

The control drum 6 is suitably mounted upon a shaft 7 which is provided with an operating handle 8 in accordance with the usual practice, and is further provided with a notched segment 9 having a plurality of teeth 1′, 2′, 3′, 4′, 5′, 6′, 7′ and 8′ which correspond to the various operative positions of the controller, but which are located a predetermined distance beyond the controller positions. The reason for displacing the teeth of the segment 9 with respect to the operative positions of the controller is to insure the exclusion of the accelerating resistors and to permit the restraining action of the apparatus at each of the operative positions, as will be hereinafter set forth.

A movable pawl 12 is positioned within straps or bearings 13 and is adapted to be actuated longitudinally therein by means of an operating lever 14 having one end 15 pivoted to a portion of the controller casing 16, the other end thereof being provided with a movable magnetizable core member 17. The magnetizable member 17 is disposed in electro-magnetic relation with the stationary magnetizable core member 18 that is provided with the energizing winding $m$, shown in Fig. 1. The operating lever 14 is biased by means of an adjustable spring 20 to a position such that the pawl 12 is normally retracted from the notched segment 9.

When the current-limiting electromagnet $m$ is sufficiently energized to attract the movable core member 17, the operating lever 14 is moved in opposition to the spring 20 and the pawl 12 is inserted into one of the notches of the segment 9 and into engagement with the radial side 21 of one of the teeth. Fig. 2 shows the relationship of parts under a condition in which the motor current is abnormal and the pawl 12 is brought into engagement with the tooth 1′, whereby further movement of the controller C in a forward direction is prevented. The rear sides 21ᶜ of the several teeth are sloped gradually in order to permit of an unrestrained backward movement of the controller at all times.

The current-limiting electro-magnet $m$ which actuates the pawl 12 may be connected directly into the motor circuit, as shown in Fig. 1, thereby being rendered dependent directly upon the motor current, or the magnet winding $m$ may be connected in a local circuit through an auxiliary source of energy, such as a battery B, and through the switch s and coöperating contact members 25 and 26 of an electro-responsive relay 27 having its energizing coil 28 connected in circuit with one of the driving motors, as shown in Fig. 4.

In the first case, the current-limiting device is directly influenced by the motor current, while in the second case, it is directly affected thereby through the agency of the electro-responsive relay. The mechanism may be electro-pneumatic as well as electromagnetic.

Assuming the apparatus and circuit connections to be as shown in Fig. 1, and the pawl 12 and associated operating lever 14, shown in Fig. 2, to be retracted by the spring 20 to their initial position, the operation of the system is as follows: The controller C is first moved into its position 1, thereby completing a circuit from the trolley T which includes contact terminal T', conducting segment 1, contact terminal T'', resistors R1, R2 and R3, motor M1, contact terminal F1', conducting segment 2, contact terminal A2', current-limiting electro-magnet $m$, and motor M2 to the return circuit G.

Energy is thus supplied to the driving motors M1 and M2 through all of the accelerating resistance and through the electromagnet $m$. As soon as the controller C attains its position 1, in which the motor circuit connections are established, a rush of current results, which in traversing the electro-magnet $m$ energizes the stationary core 18 sufficiently to attract the movable core 17, whereby the operating lever 14 and associated pawl 12 are moved immediately in such manner that the pawl 12 is inserted into the first notch and engages the radial shoulder 21 of the tooth 1'. Thus, further movement of the controller C is prevented until the counter-electro-motive force of the motors increases sufficiently to permit the motor current to be reduced to a value such that the spring 20 overcomes the action of the electro-magnet $m$ and the pawl 12 is withdrawn.

It will be understood that so long as the motor current maintains the pawl in engagement with the tooth 1', it is impossible for the operator to manipulate the controller further in a forward direction, and, therefore, he is compelled to allow the current to be reduced to a predetermined normal and safe value before he can move the controller to its second position 2.

As the motors M1 and M2 speed up and the current is reduced, the operator is permitted to continue the movement of the controller C to its position 2, whereby the resistor R1 is excluded from the motor circuit. An increase of current immediately results, which is sufficient to cause the electromagnet $m$ to actuate the pawl 12 into coöperative relationship with the tooth 2'. Thereupon, further movement of the controller is positively arrested until the motor current again falls to the predetermined value for which the electromagnet $m$ and opposing spring 20 are designed and adjusted.

In this manner, the controller C may be "notched up" or moved in a series of distinct and separate steps throughout its operation, whereby the driving motors M1 and M2 are brought up to full speed without the possibility of subjecting them to excessive accelerating currents. It is not thought necessary to trace farther the circuit connections established by the controller C inasmuch as the operation thereof will be readily understood by those skilled in the art without further amplification.

In the event that the vehicle is running or coasting on a down grade and it is desired to accelerate the driving motors, it is possible to move the controller C directly to a position such that the accelerating current rises to a value sufficient to effect the actuation of the restraining pawl. Under such conditions, therefore, the controller C is not necessarily arrested in each of its positions as is the case under normal accelerating conditions.

It should be noted that it is within the control of the operator to render the system entirely independent of the motor current by closing the switch s whereby the current-limiting electromagnet $m$ is short-circuited. Furthermore, by reason of the configuration of the teeth on the segment 9, it is always possible to "back off" the controller, if desired.

In certain instances, it may be found desirable to connect the current-limiting electromagnet $m$ indirectly into circuit as set forth in Fig. 4, but, by reason of the similarity of operation of such a modified system to that hereinbefore described, no further description thereof is deemed necessary.

In Fig. 3, I have shown a modified form of my control device or automotoneer which, while functioning in the same general manner as that already described, differs in structural details and is particularly adapted to prevent binding between the pawl 12 and the teeth of the notched segment 9. Moreover, its actuation is effected electro-pneumatically.

In this device, a notched segment $9^a$ is employed and the shoulders or sides $21^a$ of the several teeth are materially inclined in a backward direction with respect to the radial line passing through them, whereas the pawl $12^a$ is provided with a correspondingly inclined surface $21^b$ which is adapted to coöperate therewith for the purpose of locking the controller against forward movement.

It will be understood that if the engaging surfaces of the teeth be radial, as shown in Fig. 2, there may be a tendency to bind when it is attempted to move the controller drum in a forward direction, inasmuch as the pressure and friction between the pawl and teeth may not permit the release of the pawl even when the current has been reduced to the normal accelerating value. However, with the engaging surfaces of the teeth slope backwardly as shown in Fig. 3, the tendency to bind is obviated and, while the pawl is permitted to function to restrain forward movements as intended, still a slightly excessive pressure between the pawl and the teeth will assist in releasing the pawl and, therefore, insure reliable operation.

The pawl 12<sup>a</sup> is pivoted intermediate its ends upon a pin 32 and a pneumatically actuated device 33 of any suitable form is pivotally attached to the other end thereof. The operation of the device 33 is governed by a combined admission and release valve 34 which is actuated through the agency of the current-limiting electro-magnet $m$, as will be understood. The operation of the apparatus will be understood without further description. The electromagnet $m$ may, of course, be connected either in the general manner indicated in Fig. 1 or as shown in Fig. 4.

Although I have shown and described my invention as embodying more or less specific structural details and arrangement and location of parts, it will be understood that the disclosure is only illustrative of one embodiment of my invention, and that the benefits thereof may be derived from apparatus differing widely from what is herein set forth. I desire, therefore, that only such limitations shall be imposed as are indicated in the appended claims.

I claim as my invention:

1. In a controller for electric motors, the combination with a drum, contact members thereon, and a ratchet provided with a plurality of teeth having flat engaging surfaces that are sloped slightly backwardly from a radial line through the axis of the drum, of a normally restrained locking member adapted to coöperate with the sloped engaging surfaces of said teeth.

2. In a controller for electric motors, the combination with a drum, contact members thereon, and a ratchet provided with a plurality of teeth having flat engaging surfaces that are sloped slightly backwardly from a radial line through the axis of the drum, of a pivotally mounted locking pawl adapted to engage the sloped engaging surfaces of said teeth and means for actuating said pawl when the motor current becomes excessive.

3. In a controller for electric motors, the combination with a drum, contact members thereon, and a ratchet provided with a plurality of teeth having flat engaging surfaces that are sloped slightly backwardly from a radial line through the axis of the drum, of an electro responsive member having a correspondingly sloped surface adapted to coöperatively engage the engaging surfaces of said teeth to restrain movements of said drum in one direction, and means responsive to the motor current for effecting the actuation of said electroresponsive member under predetermined current conditions, the arrangement of parts being such that the pawl is readily released when excessive pressure between the pawl and the teeth is exerted.

4. In a controller for electric motors, the combination with a drum, contact members thereon, and a ratchet provided with a plurality of teeth having flat engaging surfaces that are sloped slightly backwardly from a radial line through the axis of the drum, of a normally restrained pivotally mounted pawl having a correspondingly sloped surface adapted to engage the sloping engaging surfaces of said teeth, whereby binding between said teeth and said pawl is prevented during the operation of the controller and electro-responsive means influenced by the motor current for actuating said pawl into engagement with said teeth for arresting the movement of said drum.

5. A controller for electric motors comprising a drum adapted to be rotated in both forward and backward directions, through a plurality of operating positions, a ratchet associated therewith and having a plurality of teeth located just beyond each operative position in the forward direction of operation, each tooth having a flat engaging surface that is sloped slightly backwardly from a radial line through the axis of said drum, of a movable pawl adapted to engage the backwardly sloped surfaces of said teeth.

6. In a controller for electric motors, the combination with a drum, contact members thereon, and a ratchet provided with teeth having flat engaging surfaces that are sloped slightly backwardly from a radial line through the axis of said drum, of a normally restrained pawl adapted to engage said sloped surfaces of said teeth, electropneumatic means for actuating said pawl and electro-responsive means for rendering said electro-pneumatic means dependent upon the motor current.

7. In a controller for electric motors, the combination with a drum, contact members thereon, and a ratchet provided with teeth, having engaging surfaces that are sloped backwardly from a radial line through the axis of said drum, of a movable pawl adapted to engage said teeth to arrest the forward movement of said drum, electro-pneumatic means associated with said pawl and means for causing the actuation of said electro-pneumatic means in accordance with the motor current.

In testimony whereof, I have hereunto subscribed my name this 27th day of May, 1915.

PAUL L. MARDIS.

Witnesses:
 ALEX. WEIR,
 E. J. SUNDERLAND.